United States Patent [19]

Lepore et al.

[11] 4,110,734
[45] Aug. 29, 1978

[54] ANTI-THEFT STARTING SYSTEM

[75] Inventors: Henry D. Lepore, 26 South St., Marlboro, Mass. 01752; Perry J. Saidman, Potomac, Md.

[73] Assignee: Henry D. Lepore, Marlboro, Mass.

[21] Appl. No.: 670,676

[22] Filed: Mar. 26, 1976

[51] Int. Cl.² .............................................. B60R 25/04
[52] U.S. Cl. .................................. 340/64; 307/10 AT; 180/114
[58] Field of Search ............... 340/63, 64; 307/10 AT; 180/114

[56] References Cited

U.S. PATENT DOCUMENTS

| | | | |
|---|---|---|---|
| 1,591,606 | 7/1926 | Bogg | 340/63 |
| 2,876,429 | 3/1959 | Noztitz | 340/64 |
| 3,628,056 | 12/1971 | Buchanan | 340/64 X |

*Primary Examiner*—Alvin H. Waring
*Attorney, Agent, or Firm*—Berman, Aisenberg & Platt

[57] ABSTRACT

An anti-theft starting system for automotive vehicles which is characterized in that an unauthorized person attempting to start the vehicle is led to believe that the electrical system of the vehicle is faulty. This is achieved by insertion of a current-limiting means intermediate the starter switch and the starter motor which allows the motor to crank only at a very low current, the impression resulting to the operator that the battery is low, the starter is faulty, or the like. A manually-actuable bypass switch is hidden from view of the driver and must be actuated simultaneously with the ignition switch to bypass the current limiting means.

8 Claims, 1 Drawing Figure

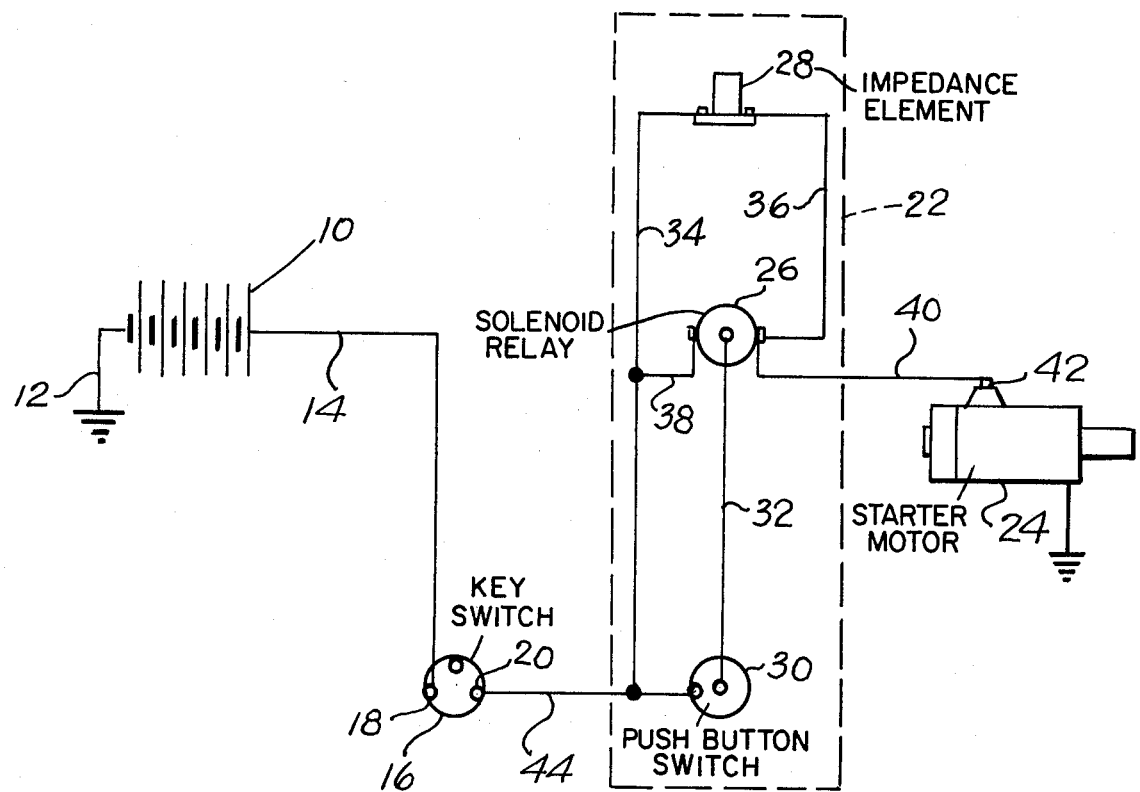

ANTI-THEFT STARTING SYSTEM

BACKGROUND OF THE INVENTION

1. Field of the Invention

The present invention is related to electric starting and ignition systems for automotive vehicles and, more particularly, is directed towards an anti-theft system for an electrical starting circuit.

2. Description of the Prior Art

Anti-theft systems for automobiles abound in the prior art. Many of such anti-theft systems are integrated with the motor vehicle's electrical system and are designed to prevent an unknowledgable and unauthorized operator from stealing the vehicle.

Previous United States patents in this field of which we are aware include: U.S. Pat. Nos. 2,764,699; 3,559,757; 3,628,056; 3,634,724; 3,783,303; and 3,885,164.

Of the foregoing, the Vest U.S. Pat. No. 3,885,164 is typical in disclosing a system wherein a capacitor 26 is connected in parallel across a pair of capacitors 18 and 25 and a coaxial line 23 so as to reduce the voltage sufficiently to prevent spark plugs 17 from maintaining engine firing. The capacitor element 26 is switched into the circuit by means of a relay including a coil 30 which is energized by a concealed magnetic proximity switch 35, intended to be selectively operated by the knowledgable owner of the vehicle.

A problem we have recognized with each of the foregoing prior art systems concerns the fact that the anti-theft circuit portions are involved in the primary circuit which includes the ignition switch that may be easily dismantled from the steering post in which it is normally housed by an unscrupulous individual. When this occurs, such an individual may energize the starting and ignition system with any blunt tool or a jumper wire from the positive post of the battery to the primary side of the coil to thereby jump start the vehicle.

Further, most of the systems in the patents set forth above do not provide any means for deceiving the unauthorized person. That is to say, if an unauthorized person attempts to steal a vehicle equipped with the, for example, Vest device, he will immediately become aware of the existence of an anti-theft device and may thereafter attempt to override same.

It would therefore be extremely useful if a vehicle could be equipped with an anti-theft device which not only prevents the vehicle from being started by unauthorized persons, but additionally which misleads and otherwise deceives the unauthorized person into believing that something is wrong with the electrical system of the vehicle, rather than making that person aware the vehicle is equipped with an anti-theft device.

OBJECTS AND SUMMARY OF THE INVENTION

It is therefore a primary object of the present invention to provide an anti-theft system for an electrical starting circuit in an automotive vehicle which prevents unauthorized starting of the vehicle.

Another object of the present invention is to provide, in an electrical starting system, means for preventing the unauthorized starting thereof which further deceives the unauthorized user into believing a fault exists in the electrical system of the vehicle.

An additional object of the present invention is to provide an electrical anti-theft system for an automobile which is inexpensive, easy to install, and may be effectively integrated with any existing electrical starting system.

The foregoing and other objects are attained in accordance with one aspect of the present invention through the provision of an anti-theft starting system which may be readily incorporated into a conventional electric starting system that includes a voltage source, a starter, and a starter switch that is connected in series intermediate the voltage source and the starter. The anti-theft system comprises means connected intermediate the starter switch and starter for preventing full actuation of the latter. The latter means comprises an impedance connected in series between the starter switch and the starter for limiting the passage of current to the starter. In this manner, the starter cranks at a very low current which effectively creates the impression of a low battery, a faulty starter, or the like.

In accordance with other aspects of the present invention, means are connected in series between the starter switch and the starter for bypassing the current limiting means. In a preferred embodiment, the bypassing means comprises a solenoid relay that is closed by manual actuation of, for example, a push-button switch. The latter may be carefully hidden out of view of the driver under the dashboard of the vehicle, for example.

BRIEF DESCRIPTION OF THE DRAWING

Various objects, features and attendant advantages of the present invention will be more fully appreciated as the same become better understood from the following detailed description thereof when considered in connection with the accompanying drawing, in which the sole FIGURE is a partial schematic and a partial block diagram illustrating a preferred embodiment of the anti-theft system of the present invention.

DETAILED DESCRIPTION OF THE PREFERRED EMBODIMENT

Referring now to the sole drawing FIGURE, a preferred embodiment of the automotive anti-theft system for electric starters is illustrated in part schematic and part block diagram form.

The anti-theft system is indicated generally within dotted outline by reference numeral 22. The anti-theft system 22 is illustrated as being connected within conventional components of an automobile ignition system. Such conventional components include a battery 10, an ignition key switch 16, and a starter motor 24.

Battery 10, which may for example comprise a 12-volt standard battery, has a negative lead 12 connected to ground, and a positive lead 14. Key switch 16 includes a hot terminal or contact 18 to which is connected the positive lead 14 from battery 10. Key switch 16 further includes a start terminal or contact 20 which has a lead 44 extending therefrom to the anti-theft circuit 22. Starter motor 24 has a positive terminal 42 to which is connected lead wire 40 which extends from the anti-theft circuit 22 of the present invention.

In a conventional automobile ignition and starting circuit, lead wires 40 and 44 are connected directly to one another such that when key switch 16 is actuated so as to short circuit terminals 18 and 20, the full current from battery 10 is delivered to starter motor 24 in order to crank same. Other components of conventional ignition systems, such as ignition coils, contact points, and distributor, are not shown for the sake of clarity.

The anti-theft circuit 22 of the present invention includes an impedance element 28 connected in parallel with a bypass element, such as solenoid relay 26. In the illustrated embodiment, solenoid relay 26 is actuated by a push-button switch 30.

Impedance element 28 is connected to the start contact 20 of key switch 16 via wires 44 and 34, and is further connected to starter motor 24 via wires 36 and 40.

Solenoid relay 26 includes a normally open switch contact (not shown) which is also connected in series between start contact 20 of key switch 16 and the positive terminal 42 of starter motor 24 via leads 44, 34, 38 and 40.

Extending between push-button switch 30 and solenoid 26 is a lead wire 32 intended to schematically represent the actuating coil line for solenoid relay 26.

Impedance element 28 is designed to pass a small amount of the full current normally provided to starter motor 24. The impedance element 28 may comprise, for example, a resistor which, when inserted in series between start contact 20 and starter motor 24, will restrict the current delivered to the starter which in turn will cause the starter to crank quite slowly and therefore deceivingly provide an indication to the unauthorized user that the battery is low, the starter is faulty, or the like.

Push-button switch 30 is normally hidden from view in the dashboard of the vehicle, the precise location of which is known only to authorized persons. To start the vehicle, the owner, when actuating key switch 16, also depresses push-button 30 to actuate solenoid 26 and effectively bypass the current limiting element 28. This will provide full current through leads 44, 34, 38, element 26, and lead 40 to starter motor 24.

The advantage of the system of the present invention is apparent. While preventing unauthorized starting of the vehicle, the system also deceives the unauthorized person into believing that either the battery 10 is low, the starter 24 is faulty, or some other electrical infirmity exists in the system. This is achieved by virtue of the low current allowed through impedance element 28 to reach starter motor 24. The impedance element 28 and solenoid 26 may be positioned inconspicuously under the hood of the vehicle, and the button 30, which may, if desired, comprise a plurality of push-buttons, may be located on the interior of the vehicle in an inconspicuous hidden locale.

The unauthorized person, upon encountering the apparently faulty electrical circuit, will soon be discouraged from his devious task. Even if he is not dissuaded, the battery will not be able to be run down by such a person, nor will a "jump start" across the positive and negative terminals of the battery assist him in stealing the vehicle.

Obviously, numerous modifications and variations of the present invention are possible in light of the above teachings. For example, lead wire 38 may be connected directly to positive lead 14 from battery 10, if desired. It is therefore to be understood that within the scope of the appended claims the invention may be practiced otherwise than as specifically described herein.

I claim as my invention:

1. In an electric starting system having a voltage source, a starter, and a starter switch connected in series intermediate said voltage source and said starter, the improvement which comprises impedance means connected intermediate said starter switch and said starter for preventing full actuation of said starter, and means connected in series between said starter switch and said starter for selectively bypassing said impedance means.

2. The electric starting system as set forth in claim 1, wherein said impedance means is connected in series between said starter switch and said starter for limiting passage of current to said starter.

3. The electric starting system as set forth in claim 1, wherein said bypassing means comprises a solenoid relay.

4. The electric starting system as set forth in claim 3, wherein said bypassing means further includes means for manually actuating said relay.

5. The electric starting system as set forth in claim 4, wherein said manual actuating means comprises a push-button switch.

6. An anti-theft system for electric starters, which comprises:
   a battery;
   a starter motor;
   a starter switch having a start position and connected between said battery and said starter motor; and
   means connected intermediate said starter switch and said starter motor for limiting the current from said battery to said starter motor to a relatively small portion of that normally available for causing said battery to seem faulty when said starter switch is in said start position.

7. The anti-theft system as set forth in claim 6, further comprising manually actuable switch means for overriding said means for causing said battery to seem faulty.

8. An anti-theft device for an electric starter system, which comprises:
   a source of current;
   a starter motor;
   a starter switch which is key-operated between an off position and a start position to respectively open circuit and close circuit said source of current and said starter motor; and
   impedance means connected between said starter switch and said starter motor for causing said electric starter system to seem faulty when said starter switch is in said start position.

* * * * *